(12) United States Patent
Senoh

(10) Patent No.: US 7,865,960 B2
(45) Date of Patent: Jan. 4, 2011

(54) DIGITAL LITERARY WORK PROTECTION SYSTEM AND DIGITAL LITERARY WORK PROTECTION METHOD

(75) Inventor: Takanori Senoh, Osaka (JP)

(73) Assignee: Panasonic Corporation, Osaka (JP)

(*) Notice: Subject to any disclaimer, the term of this patent is extended or adjusted under 35 U.S.C. 154(b) by 1250 days.

(21) Appl. No.: 10/570,171

(22) PCT Filed: Sep. 2, 2004

(86) PCT No.: PCT/JP2004/012724

§ 371 (c)(1),
(2), (4) Date: Mar. 1, 2006

(87) PCT Pub. No.: WO2005/025129

PCT Pub. Date: Mar. 17, 2005

(65) Prior Publication Data

US 2007/0008568 A1 Jan. 11, 2007

(30) Foreign Application Priority Data

Sep. 4, 2003 (JP) ............................. 2003-312321

(51) Int. Cl.
*H04L 29/00* (2006.01)
*H04L 29/12* (2006.01)

(52) U.S. Cl. ...................... 726/26; 726/27; 726/28; 726/29; 726/2; 713/182; 713/187; 380/200; 380/201

(58) Field of Classification Search ................ None
See application file for complete search history.

(56) References Cited

U.S. PATENT DOCUMENTS 5,787,171 A 7/1998 Kubota et al.
5,983,350 A 11/1999 Minear et al.
6,609,198 B1 8/2003 Wood et al.

(Continued)

FOREIGN PATENT DOCUMENTS

JP 8-23313 1/1996

(Continued)

OTHER PUBLICATIONS

English language Abstract of JP2002-288377.

(Continued)

*Primary Examiner*—Syed A. Zia
(74) *Attorney, Agent, or Firm*—Greenblum & Bernstein P.L.C.

(57) ABSTRACT

In a digital content protection system for legally transmitting encrypted digital content from a transmitting device to a receiving device, unique device identifiers for devices are registered to a specific server in advance. The server also stores in advance information relating to an authentication method usable by each device, associating the information relating to an authentication method with the unique device identifiers. The transmitting device determines whether an identifier unique to the second device is stored on the server. When stored, the transmitting device determines that the receiving device is legal and determines from the server the appropriate authentication procedure. When the transmitting device has the determined procedure, the transmitting device uses this procedure to verify the authenticity of the receiving device. When the transmitting device does not have the determined procedure, the transmitting device acquires the authentication procedure from a source external to the transmitting device and then uses the acquired procedure to validate the receiving device.

12 Claims, 5 Drawing Sheets

U.S. PATENT DOCUMENTS

| | | | |
|---|---|---|---|
| 6,859,535 B1 | 2/2005 | Takebayashi et al. | |
| 7,181,620 B1 * | 2/2007 | Hur | 713/171 |
| 7,415,439 B2 * | 8/2008 | Kontio et al. | 705/53 |
| 7,421,411 B2 * | 9/2008 | Kontio et al. | 705/52 |
| 7,487,363 B2 * | 2/2009 | Alve et al. | 713/193 |
| 7,596,812 B2 * | 9/2009 | Li et al. | 726/26 |
| 7,610,630 B2 * | 10/2009 | Ji et al. | 726/29 |
| 2002/0150243 A1 | 10/2002 | Craft et al. | |
| 2003/0084306 A1 * | 5/2003 | Abburi et al. | 713/188 |
| 2004/0034600 A1 * | 2/2004 | Senoh et al. | 705/50 |
| 2004/0236956 A1 | 11/2004 | Shen et al. | |
| 2005/0084087 A1 * | 4/2005 | Rajagopalan et al. | 379/205.01 |
| 2006/0158341 A1 * | 7/2006 | Chipchase et al. | 340/825.22 |
| 2010/0017627 A1 * | 1/2010 | Princen et al. | 713/193 |

FOREIGN PATENT DOCUMENTS

| | | |
|---|---|---|
| JP | 2001-54171 | 2/2001 |
| JP | 2001-202332 | 7/2001 |
| JP | 2002-288377 | 10/2002 |
| JP | 3380194 | 12/2003 |
| WO | 02/048938 | 10/2002 |

OTHER PUBLICATIONS

English language Abstract of JP 3380194.
English Language Abstract JP 8023313.
English language Abstract of JP2002-288372.
English Language Abstract JP 2001-202332.
English Language Abstract JP 2001-54171.

* cited by examiner

DIGITAL LITERARY WORK PROTECTION SYSTEM AND DIGITAL LITERARY WORK PROTECTION METHOD

TECHNICAL FIELD

The present invention relates to a system for legally copying and transmitting digital content that is protected by copyright.

BACKGROUND ART

A conventional digital content protection system enabling legally copying and communicating copyrighted digital content is taught, for example, in Japanese Patent 3380194. When a device ("transmitting device" below) that first transmits the digital content in this system copies and sends the digital content to another device (the "receiving device"), the transmitting device encrypts the digital content using a unique key and records the encrypted digital content to a memory card storing the same unique key. The memory card is then sent to the receiving device. The receiving device then reads the unique key from the memory card and decrypts the encrypted digital content stored in the memory card using this unique key.

FIG. 5 describes the legal copy and transmission of copyrighted digital content using the conventional digital content protection system taught in Japanese Patent 3381094.

As shown in FIG. 5, this digital content protection system includes a memory card 10, a transmitting device 20b, and a receiving device 30b. When copying digital content, the internal unique key 11 is read from the memory card 10 and encrypted, and then sent as information 111 to the transmitting device 20b. The authentication unit 21b of the digital content transmitting device 20b then decrypts the received information 111 to acquire the unique key 11. Only authentic transmitting devices know the correct method of decoding the information 111, and the transmitting device can thus be verified. The content processing unit 22b then encrypts the copyrighted digital content 23b using the decrypted unique key 11, and then records the resulting encrypted content 231 to the digital content recording area 12 of the memory card 10. The recorded digital content 23b is then sent with the memory card to which it is stored to the receiving device 30b.

The receiving device 30b then reads the encrypted unique key information 111 from the memory card 10, and the receiver-side authentication unit 21b decrypts and acquires the unique key 11. The decryption unit 32b reads and decrypts the encrypted content from the digital content recording area 12 using the acquired unique key 11, and outputs the decrypted content.

The unique key 11 stored in the memory card cannot be read directly, and can only be read as encrypted data 111. Therefore, if the receiving device 30b is unauthorized, it cannot correctly decode the encrypted data 111, and unauthorized copy of digital content can be prevented.

Furthermore, when digital content is recorded to an unauthorized memory card 10 that does not have the unique key, the authentication unit 21b of the transmitting device 20b is unable to verify the memory card 10, and illegal copying is therefore again prevented.

DISCLOSURE OF THE INVENTION

The device verification method and content encryption method are fixed in the conventional system described above. Thus a problem with the conventional system is that if the legal device uses a different verification method or encryption method, even authorized devices are unable to legally copy and communicate digital content.

The present invention is therefore directed to solving this problem, and an object of this invention is to provide a digital content protection system enabling the legal copy and communication of copyrighted digital content with any other legal device even if the device verification methods or encryption methods used by the communicating devices differ.

A digital content protection system according to the present invention is a system for legally transmitting and receiving encrypted digital content. This system includes a first device for transmitting encrypted digital content, a second device for receiving digital content from the transmitting device, and a specific server. The specific server stores a unique device identifier for each of devices together with information relating to an authentication procedure usable by each device. The information relating to an authentication procedure is linked to the unique device identifiers. The first device determines whether an identifier unique to the second device is stored on the specific server. If this unique identifier is stored on the server, the first device determines that the second device is a legal device. To implement authentication procedure which is implemented only by the second device to verify that the third party does not abuse the identifier, the first device also determines from the server the appropriate authentication procedure for the second device based on the identifier. If the first device has the determined authentication procedure, the first device uses this procedure to verify the authenticity of the second device. If the first device does not have the determined authentication procedure, the first device acquires the authentication procedure from an external source, and then uses the acquired procedure to validate the second device.

The first device can acquire the key unique to the second device through this verification process, use the unique key to encrypt the digital content decryption key and use conditions, and then send the encrypted decryption key and use conditions to the second device.

A receiving device according to the present invention receives encrypted digital content from a transmitting device legally. The receiving device has a private key that cannot be externally read, a unique identifier that is paired with the private key, and an encryption/decryption unit for downloading an algorithm from an external device. The receiving device transmits information describing the unique identifier to the transmitting device to prove the authenticity of the receiving device. If the transmitting device thus verifies the authenticity of the receiving device, the receiving device receives encrypted digital content from the transmitting device and decrypts the received digital content using the private key and encryption/decryption unit according to the algorithm specified by the transmitting device.

A transmitting device according to the present invention legally sends encrypted digital content to a receiving device. The transmitting device is connected over a network to a specific server. This specific server stores identifiers unique to each of a plurality of devices to prove the authenticity of the devices, and also stores information about the authentication procedures that can be used by the individual receiving devices, in which the authentication procedures are linked to the unique identifiers. The transmitting device determines whether the identifier unique to the receiving device is stored in the specific server. If the unique identifier is stored, the transmitting device verifies that the receiving device is legal, and determines the authentication procedure to be used from the specific server based on the unique identifier. If the first device has the determined authentication procedure, the transmitting device verifies the authenticity of the second device using the determined authentication procedure. If not having the determined authentication procedure, the transmitting device acquires the authentication procedure from an external and then verifies the second device using the acquired authentication procedure.

The transmitting device can also transmit information indicating the decryption method for the encrypted digital content to the receiving device.

According to the present invention, the digital content protection system can safely and legally copy and communicate digital content over a network without using memory cards that are accessed using a specific uniform method. Furthermore, even if the transmitting and receiving devices do not conform to the same copyright protection method, digital content can be legally copied and communicated insofar as the authenticity of the receiving device is confirmed.

BEST MODE FOR CARRYING OUT THE INVENTION

A preferred embodiment of a digital content protection system according to the present invention is described below with reference to the accompanying drawings.

1. General Configuration of a Digital Content Protection System

Figure 1:
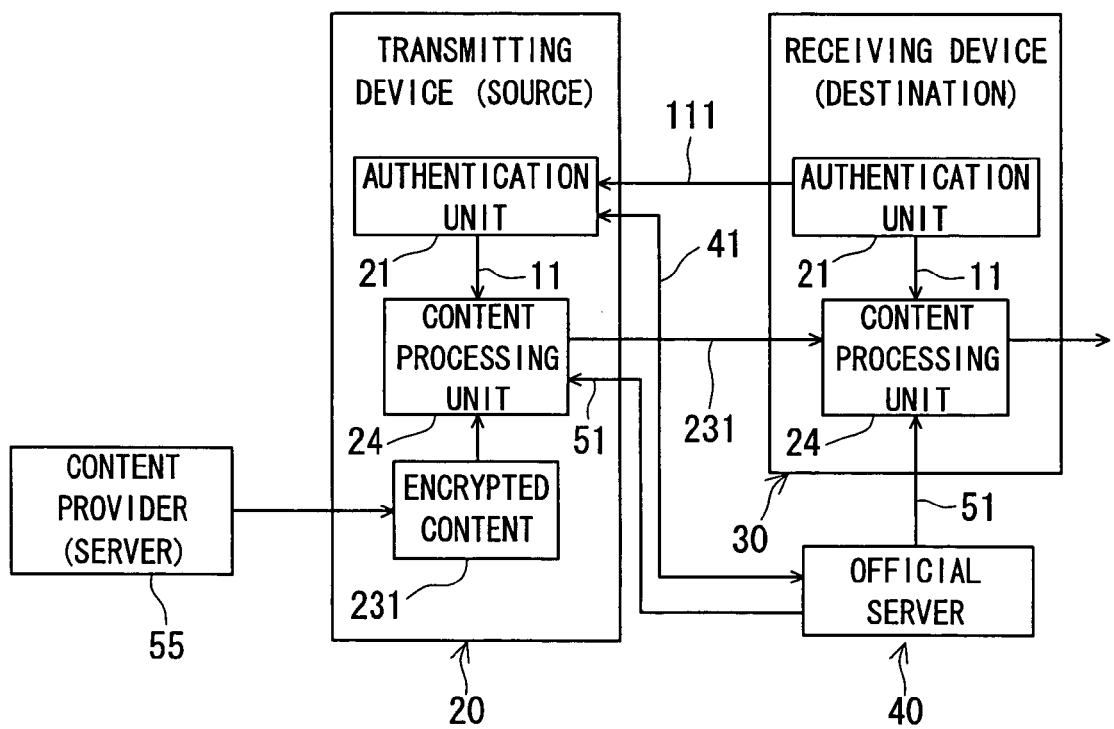
FIG. 1 is a block diagram of a digital content protection system according to the present invention.
Figure 5:
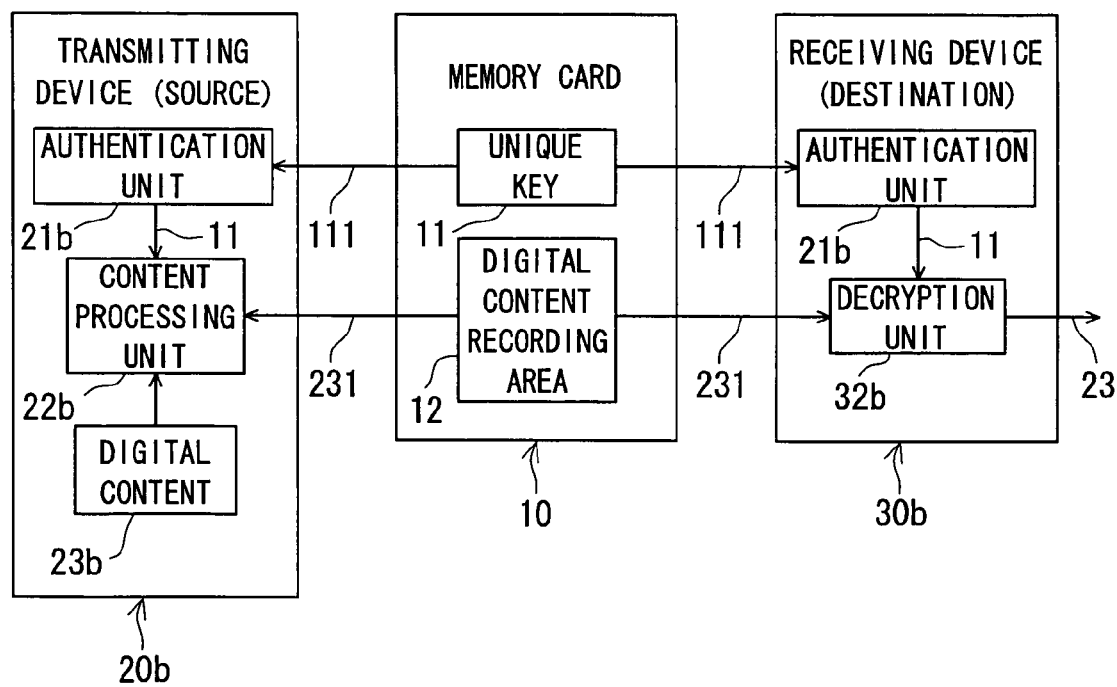
FIG. 5 is a block diagram of a digital content protection system according to the prior art.

FIG. 1 is a block diagram of a digital content protection system according to the present invention. Like parts are identified using the same reference numerals in FIG. 1 and FIG. 5.

As shown in FIG. 1, this digital content protection system has a transmitting (source) device 20 for copying and sending digital content, a receiving (destination) device 30 for receiving the digital content from the transmitting device 20, and an official server 40.

The transmitting device 20 for transmitting the digital content is connected over a network (or communication line) to the receiving device 30 that receives the copied digital content. The official server 40 is also connected to the network, and stores identification numbers unique to particular devices including the receiving device 30, connected to the network,. The official server 40 also has a function for providing algorithms (tools) for decrypting encrypted content 231. A server 55 of the content provider is also connected to the network.

In a digital content protection system according to the present invention, when the transmitting device 20 copies and sends digital content to the receiving device 30, the transmitting device 20 first authenticates the legitimateness of the receiving device 30 based on identifier of the receiving device 30. After the receiving device 30 is thus authenticated, the transmitting device 20 acquires the mutual authentication procedure to be used between the transmitting device 20 and receiving device 30, and uses the acquired procedure to authenticate the receiving device.

2. Detailed Configuration of the Transmitting and Receiving Devices

Figure 2:
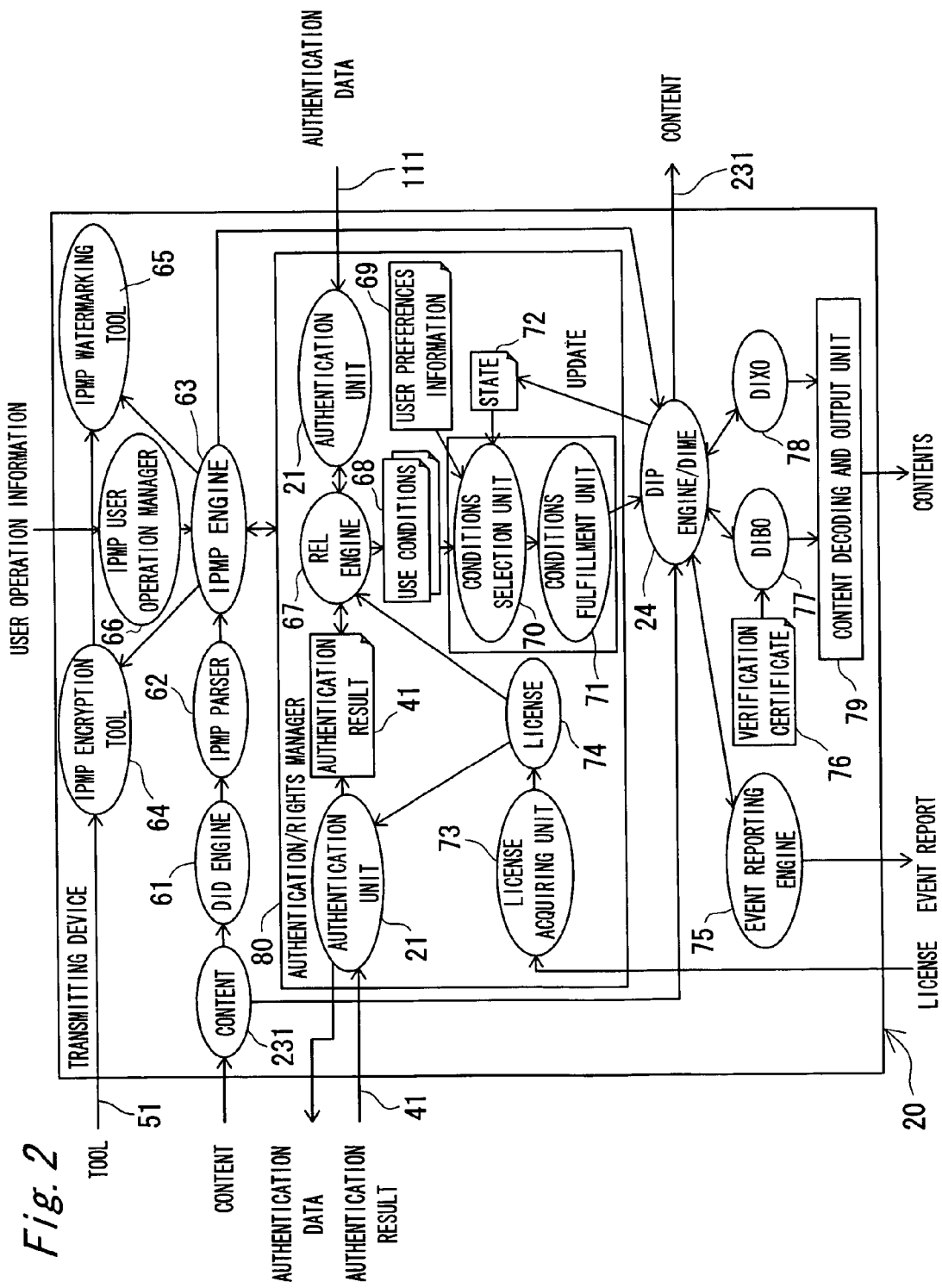
FIG. 2 is a block diagram showing the transmitting (source) device in detail.
Figure 3:
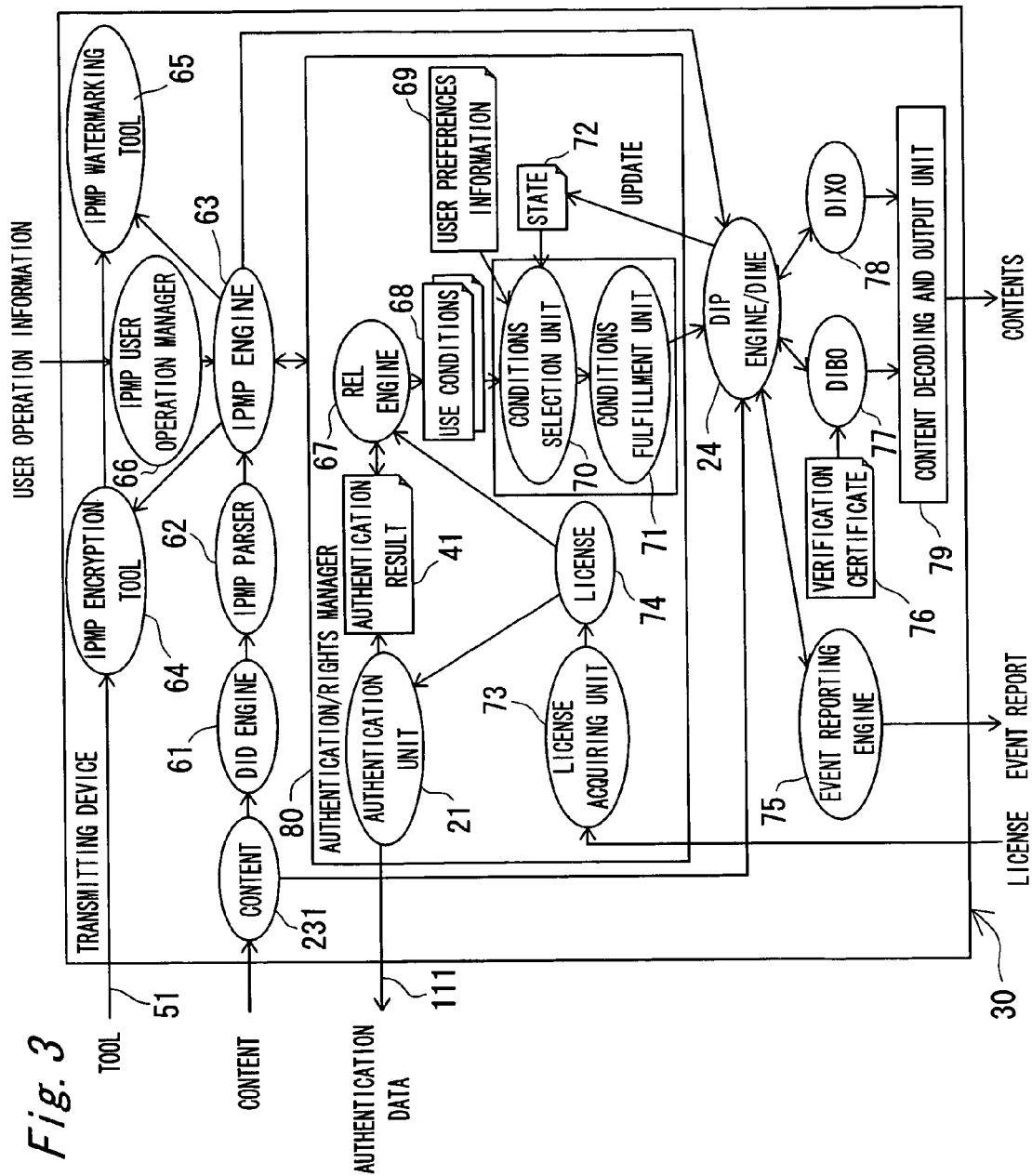
FIG. 3 is a block diagram showing the receiving (destination) device in detail.

FIG. 2 is a detailed block diagram showing the transmitting device 20 shown in FIG. 1, and FIG. 3 is a detailed block diagram showing the receiving device 30. It is noted that the transmitting device 20 and receiving device 30 can be identically configured.

Referring to FIG. 2 and FIG. 3, the DID engine 61 parses and executes a Digital Item Declaration (DID) which is a metadata in Intellectual Property Management and Protection (IPMP). More specifically, the DID engine 61 parses the structure of the digital content. The IPMP parser 62 parses information relating to IPMP for copyright protection in particular. The IPMP engine 63 executes a specific IPMP process based on the parsed result from the IPMP parser 62. For example, the IPMP engine 63 could run a process to determine the tool required for decryption and then download the necessary tool from a server.

The DIP engine/DIME 24 is a module for decrypting supplied digital content and then outputting the decrypted digital content. The DIP engine/DIME 24 calls and runs a DIBO (Digital Item Based Operation) 77 or DIXO (Digital Item eXtended Operation) 78 as subroutines. A DIBO 77 is a module for executing standard functions defined in MPEG-21, including decryption, user authentication, and digital watermark detection. DIXO 78 is a module for running extended functions that are not defined in MPEG-21 and are acquired from the external source. The REL (Rights Expression Language) engine 67 analyzes and manages the description of rights contained in the parsed output from the DID engine 61. The Event Reporting engine 75 is a module for reporting user processes to the copyright holder. The Event Reporting engine 75 could thus report to the copyright holder that the user has played the content, or has copied the content three times, for example.

The authentication result 41 contains the registered/unregistered authentication result returned by the official server 40.

3. Information Managed by the Official Server

Figure 4:
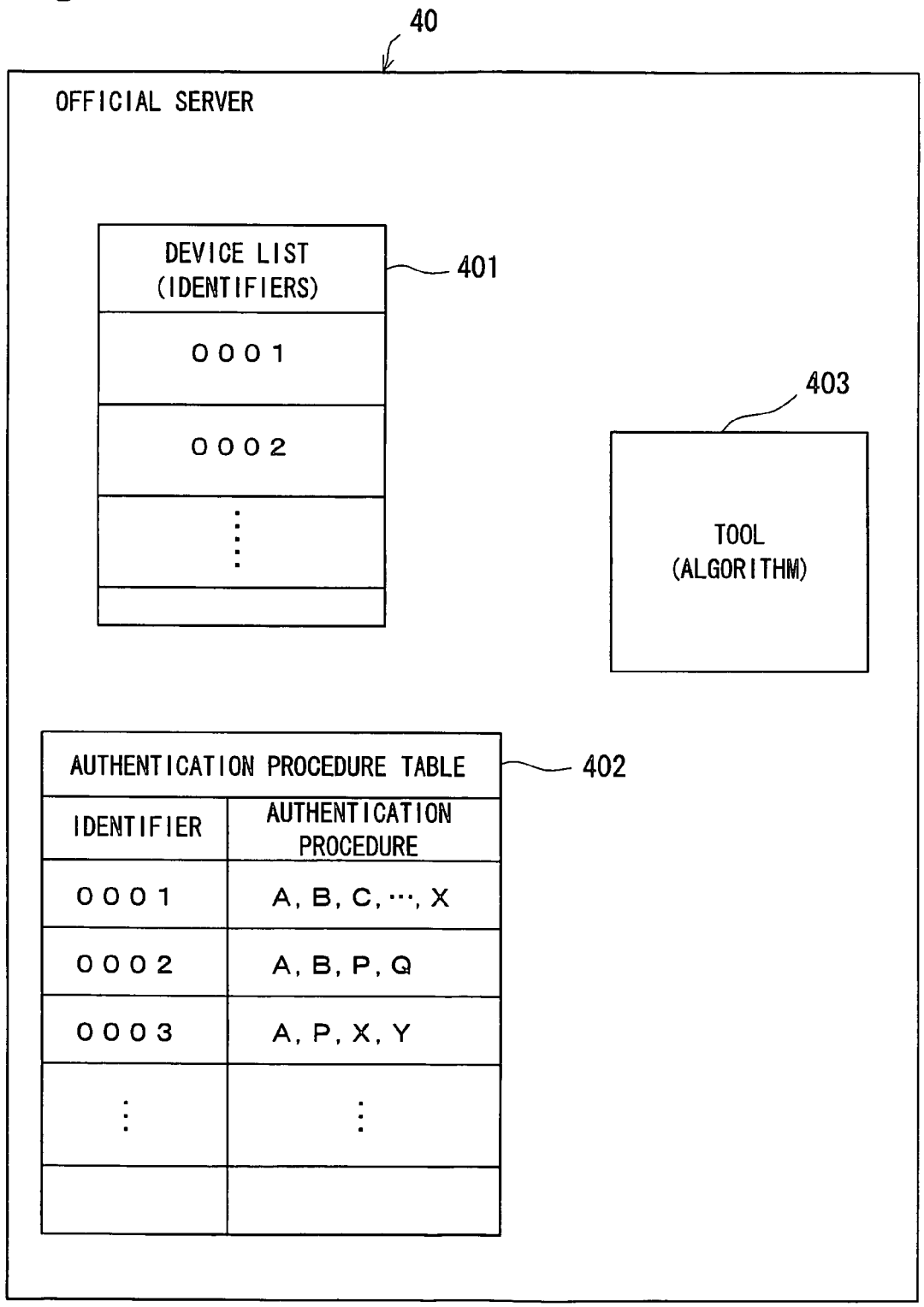
FIG. 4 shows several kinds of information stored in an official server.

The official server 40 is managed by a certification authority, and information stored on the official server 40 can be considered reliable and secure. FIG. 4 shows some information typically stored on the official server 40, including a device list 401 and an authentication procedure table 402.

The device list 401 stores a unique identifier assigned to each device connected to the network. Device serial numbers assigned by the manufacturer to each device can be used as the device identifiers, for example, but other information that is unique to a particular device could also be used. Registration of a device identifier in the device list 401 means that the device having that identifier is a verified, authorized device. The device list 401 thus assures the identity of the device containing a registered identifier.

The authentication procedure table 402 contains information correlating device identifiers to the authentication procedures that can be executed by each particular device.

The official server 40 also stores various tools (algorithms) 403. These tools include software for encryption, decoding, watermark detection, and counting the number of copies made. The tools 403 can be downloaded and installed to a particular device.

The device list 401, authentication procedure table 402, and tool 403 are stored in a single server in the example shown in FIG. 4, but the information could be stored on separate servers.

4. Procedure of Copying and Transmitting Digital Content

A procedure such as described below is run to legally copy and communicate digital content in a digital content protection system according to the present invention described above.

The transmitting device 20 first acquires encrypted digital content (encrypted content) 231 from the content provider 55 by paying the appropriate compensation. In addition to the encrypted content 231, the transmitting device 20 also acquires a license (decryption key) 74 for decrypting the content by the license acquiring unit 73. The encrypted content 231 includes the encrypted content, use conditions thereof, and information (IPMP information) about the copyright protection method applicable to the acquired content.

The DID engine 61 then analyzes the content of the encrypted content 231. If the use conditions are encrypted, the DID engine 61 passes the encrypted content 231 through the IPMP parser 62 to the IPMP engine 63 for decrypting. The decrypted use conditions 68 are then passed to the REL engine 67. The DID engine 61 also extracts and passes the IPMP information to the IPMP parser 62.

The IPMP parser 62 parses the IPMP information to detect the method for decrypting the encrypted content. If the transmitting device 20 does not have tools needed to decrypt the digital content, such as IPMP decryption tool 64 or IPMP watermarking tool 65, the IPMP parser 62 downloads the IPMP decryption tool 64 or IPMP watermarking tool 65 from the official server 40 with reference to the IPMP information, and passes the tool to the IPMP engine 63. The IPMP information also includes the address or path denoting the location of the official server 40 from which the necessary tool can be downloaded. The IPMP parser 62 can know where the tool is stored by referencing this information.

The IPMP engine 63 incorporates these tools in the DIBO 77 or DIXO 78. The IPMP engine 63 verifies the tools according to a predefined process, and if the tool is verified appends a verification certificate 76 to the tool before sending the tool to the DIBO 77 or DIXO 78, thereby avoiding unauthorized tools being purposely sent. Standard X.509 in ITU (International Telecommunication Union) can be used for certification. These tools 64 and 65 are software, and thus they can be easily incorporated where needed.

The encrypted content is then passed to the DIP engine/DIME 24 as the content processing unit, and thereby decoded using DIBO 77 and DIXO 78. If the content is also compressed, the content decoding and output unit 79 decompresses and then outputs the content.

AES (Advanced Encryption Standard), Elliptic Curve Cryptosystem, or other encryption method could be used for content encryption. ISO/IEC14496-10 (MPEG-4/AVC), ISO/IEC 14496-3/AMD1 (MPEG-4 Audio Bandwidth Extension), or other method could be used to compress and decompress the digital content.

The REL engine 67 parses the use condition 68 and passes the result to the conditions selection unit 70. The conditions selection unit 70 examines the predefined user preferences information 69 and the state 72 of the DIP engine/DIME 24, selects conditions best suited to the user within the allowed use conditions, such as the picture quality, image size, and sound quality, and pass to the conditions fulfillment unit 71. The condition fulfillment unit 71 then sets those conditions in the DIP engine/DIME 24.

The use conditions 68 specify, for example, permitted number of decode and output, permitted number of copy, permitted usable period, and permitted number of use. When the number of decode and output of the content is restricted by the use conditions 68, the REL engine 67 decrements the number of permitted decode and output in the use conditions 68 each time the encrypted content 231 is decoded and output. The Event Reporting engine 75 may also send the number of decoding the encrypted content 231 by the DIP engine/DIME 24 to the content provider 55 as an event report.

5. Authentication Procedure of the Receiving Device

The operation whereby the user copies the encrypted content 231 on the transmitting device 20 for transmission to a third party (receiving device 30) is described next.

On the transmitting device 20 side, the IPMP user operation manager 66 receives a copy request from the user, and sends the copy request to the REL engine 67 through the IPMP engine 63. The REL engine 67 then checks the use conditions 68, and activates the authentication unit 21 if copying is permitted. The authentication unit 21 acquires the authentication data 111 containing the unique identifier assigned to the receiving device 30 from the receiving device 30 to which the copy is to be sent. The authentication unit 21 then sends the acquired authentication data 111 to the official server 40, and queries the official server 40 to determine if the identifier contained in the authentication data 111 is registered on the official server 40. The authentication unit 21 thus verifies the authenticity of the receiving device 30 using the identifier for the receiving device 30. If the identity of the receiving device 30 is thus verified, the authentication unit 21 determines the authentication procedure for processing the authentication data 111 based on the identifier in the authentication data 111 obtained from the receiving device 30. After determination of the authentication procedure, the authentication unit 21 creates a key unique to the receiving device 30 based on the identifier of the receiving device 30. This completes the authentication process. It is noted that as the authentication procedure, X.509 of ITU can be used, or another method could be used.

The method of determining the authentication procedure is described next below.

As shown in FIG. 4, an authentication procedure table 402 recording information of authentication procedures that can be used by each legal device linked to the unique identifier for each device is registered with the official server 40 in advance. The authentication unit 21 of the transmitting device 20 queries the authentication procedure table 402 of the official server 40 based on the identifier of the receiving device 30 to determine the authentication procedure to be used. More specifically, the authentication unit 21 of the transmitting device 20 uses the identifier of the receiving device 30 to query the official server 40 and find the authentication procedures that can be used by the receiving device 30. If there are one or more authentication procedures that can be used by both the transmitting device 20 and receiving device 30, the authentication unit 21 selects one of the authentication procedures to use. If the authentication unit 21 does not have an authentication procedure that can be used by the receiving device 30, the IPMP engine 63 accesses the official server 40 and downloads a authentication procedure that can be used by the receiving device 30. The downloaded authentication procedure is then incorporated in the authentication unit 21. Then the authentication procedure is used to validate the receiving device 30 and acquire a key unique to the receiving device 30.

The unique key acquired for the receiving device 30 by this authentication procedure is then used by the REL engine 67 to encrypt the decryption key of the encrypted content 231. The REL engine 67 also generates use conditions for the receiving device 30 conforming to the received use conditions 68. In this case, the use conditions given to the receiving device 30 may be set such that copy could be prohibited, or part of the number of copies that the device 30 is permitted could be assigned to the receiving device. The DIP engine/DIME 24 then copies the encrypted content 231, and encrypts the decryption key of the encrypted content 231 and the newly generated use conditions using the unique key of the receiving device 30. The DIP engine/DIME 24 adds the encrypted decryption key and use conditions to the encrypted content 231, and sends the result as new copyright content to the receiving device 30.

6. Decoding Process on the Receiving Device

The DID engine 61 of the receiving device 30 extracts the encrypted use conditions and decryption key from the received encrypted content 231 and passes them to the IPMP engine 63. The IPMP engine 63 uses a private key that is embedded in the receiving device 30 and cannot be externally read, to decrypt the encrypted permissions and decryption key. The decrypted use conditions 68 are then passed to the REL engine 67, and the decoded decryption key is passed to the DIBO 77 or DIXO 78. The REL engine 67 controls the DIP engine/DIME 24 according to the acquired use conditions 68, and decodes the encrypted content 231 and extracts the digital content by using the DIBO 77 or DIXO 78.

If the content is also compressed, the content decoding and output unit 79 decompresses and then outputs the content.

The transmitting device 20 could also send information specifying the method for decoding the encrypted digital content to the receiving device 30. If the receiving device 30 does not have the tools needed to execute the specified encryption method in this case, the receiving device 30 downloads the needed tools from the official server 40 and incorporate the tools in the DIBO 77 or DIXO 78 for use.

The private key of the receiving device 30 could be embedded in an LSI chip in the receiving device 30 so that the private key cannot be read externally. This is safe because even if a third party illegally receives the encrypted content 231, the third party cannot read the received content because the necessary private key is not accessible. Furthermore, the private key could also be written to a photosensitive memory device of which data is erased when the device exposed to light, thereby increasing safety in the event some third party attempts to read the private key by physically disassembling the chip.

Mutual authentication (verification) using the authentication procedure of the receiving device 30, and legally, safely copying and communicating copyrighted digital content, are thus possible, even when the authentication procedures stored by the transmitting device 20 and receiving device 30 are different.

7. Variations

The official server 40 is used in the foregoing embodiment to verify the authenticity of the receiving device and download tools to the authentication unit, but these functions could be handled by separate servers.

Furthermore, the authentication unit 21 built in the transmitting device 20 handles the authentication procedure with the receiving device 30, generates new use conditions 68 for the receiving device, encrypts the decryption key for decoding the encrypted content, and sends the new use conditions and decryption key to the receiving device 30, but the content provider 55 could alternatively perform these tasks. In this case, the transmitting device 20 only handles copying the content and sending it to the receiving device 30, the Event Reporting engine 75 notify the content provider 55 that the content was copied and delivered, and the content provider 55 runs the other processes.

The transmitting device 20 and receiving device 30 in the foregoing embodiment can be achieved using a computer or other open architecture hardware device running appropriate software programs. Alternatively, all processing means could be integrated to one or more LSI devices, and the entire processing device can be molded into a single card-like device constructed, so that the processes executed by the card device cannot be externally observed. This increases the safety of the overall system.

System safety can also be improved by using storage elements that react and self-destruct when internal data or structures are exposed to light or oxygen as a result of the integrated device being opened, thereby preventing the internal circuits and data from being analyzed after physically disassembling the integrated device.

INDUSTRIAL APPLICABILITY

A digital content protection system according to the present invention has means for verifying the authenticity of devices which are connected via a network and to which content is transmitted, and a function for downloading authentication procedures and copyright protection tools. Thus it is useful as a safe, flexible distribution system for distributing copyrighted digital content over a network. Furthermore, since the protection system according to the present invention can download tools for decoding encrypted digital content even when the transmitting and receiving devices use different content protection methods, the present invention can be used as a common digital content protection system that can be deployed worldwide. It is noted that the network could also be a wireless network, and the invention can thus also be used in cell phone and digital broadcasting applications.

The present invention has been described with reference to a specific embodiment thereof, and other variations, modifications, and applications will be obvious to one with ordinary skill in the related art. The invention shall also not be limited to the description of the foregoing embodiment, and shall only be limited by the scope of the accompanying claims.

It is noted that the present invention relates to Japanese Patent Application No. 2003-312321 filed on Sep. 9, 2003, the content of which is incorporated herein by reference.

The invention claimed is:

1. A digital content protection system for transmitting and receiving encrypted digital content that is legally protected by copyright, comprising:

a transmitter operable to transmit encrypted digital content;

a receiver operable to receive digital content from the transmitter; and a specific server which stores identifiers for several system components, each identifier being unique to each system component, and further storing information relating to an authentication procedure usable by each system component, with the information relating to an authentication procedure being linked to the unique identifier, wherein the transmitter determines whether an identifier unique to the receiver is stored on the specific server, when the unique identifier is stored on the server, the transmitter determines that the receiver is a legal system component, and also determines, from the server, the appropriate authentication procedure for the receiver based on the identifier, when the transmitter has the determined authentication procedure, the transmitter uses the determined procedure to verify the authenticity of the receiver, and when the transmitter does not have the determined authentication procedure, the transmitter acquires the authentication procedure from a source external to the transmitter and then uses the acquired procedure to validate the receiver, wherein authorization to legally transmit and receive the encrypted digital content legally protected by copyright is received by payment of an appropriate compensation to a content provider.

2. The digital content protection system according to claim 1, wherein the transmitter acquires a key unique to the receiver through the verification process, uses the unique key to encrypt a key for decryption of the digital content and use conditions of the digital content, and then transmits the encrypted decryption key and use conditions to the receiver.

3. A receiver which receives encrypted digital content that is legally protected by copyright transmitted from a transmitter, comprising:

a private key that cannot be externally read;

a unique identifier that is paired with the private key; and an encrypter/decrypter for downloading an algorithm from a source external to the transmitter, wherein the receiver transmits information about the unique identifier to the transmitter to prove the authenticity of the receiver, when the receiver is authenticated, the receiver receives encrypted digital content from the transmitter, and decrypts the received content using the private key and the encrypter/decrypter according to the algorithm specified by the transmitter, and wherein authorization to legally transmit and receive the encrypted digital content legally protected by copyright is received by payment of an appropriate compensation to a content provider.

4. A transmitter which transmits encrypted digital content that is legally protected by copyright to a receiver, wherein the transmitter is connected over a network to a specific server, the specific server storing identifiers unique to several network components to prove the authenticity of the network components, and also storing information about authentication procedures that can be used by the individual network components with each authentication procedure linked to each unique identifier, the transmitter determines whether the identifier unique to the receiving device is stored in the specific server, when the unique identifier is stored, the transmitter determines that the receiver is a legal system component, and determines the authentication procedure to be used from the specific server based on the unique identifier, and when the transmitter has the determined authentication procedure, the transmitter verifies the authenticity of the receiver using the determined authentication procedure, and when the transmitter does not have the determined authentication procedure, the transmitter acquires the authentication procedure from a source external to the transmitter and then verifies the receiver using the acquired authentication procedure, wherein authorization to legally transmit and receive the encrypted digital content legally protected by copyright is received by payment of an appropriate compensation to a content provider.

5. The transmitter according to claim 4, wherein the transmitter acquires a key unique to the receiver through the verification process, uses the unique key to encrypt a key for decryption of the digital content and use conditions of the digital content, and then transmits the encrypted decryption key and use conditions to the receiver.

6. The transmitter according to claim 5, wherein the transmitter transmits information indicating the decryption method for the encrypted digital content to the receiver.

7. A method for transmitting encrypted digital content that is legally protected by copyright from a transmitter to a receiver, comprising:

storing in advance, to a specific server, identifiers for several system components, each identifier being unique to each system component, and further storing in advance, to the specific server, information relating to an authentication procedure usable by each system component with the information relating to the authentication procedure being linked to the unique identifier;

determining whether an identifier unique to the receiver is stored on the specific server;

when the unique identifier is stored on the server, determining that the receiver is a legal system component, and also determining, from the server, the authentication procedure for the receiver based on the identifier; and when the transmitter has the determined authentication procedure, using the determined procedure to verify the authenticity of the receiver; and when the transmitter does not have the determined authentication procedure, acquiring the authentication procedure from a source external to the transmitter and then using the acquired procedure to validate the receiver, wherein authorization to legally transmit and receive the encrypted digital content legally protected by copyright is received by payment of an appropriate compensation to a content provider.

8. The digital content protection method according to claim 7, further comprising acquiring a key unique to the receiver through the verification process, using the acquired unique key to encrypt a key for decryption of the digital content and use conditions, and then transmitting the encrypted decryption key and use conditions to the receiver.

9. A method for receiving at a receiver encrypted digital content that is legally protected by copyright transmitted from a transmitter, wherein the receiver includes a private key that cannot be externally read, a unique identifier that is paired with the private key, and an encrypter/decrypter operable to download an algorithm from a source external to the transmitter, and the method comprises:

transmitting information about the unique identifier to the transmitter to prove the authenticity of the receiver, when the receiver is authenticated, receiving encrypted digital content from the transmitter, and decrypting the received content using the private key and the encrypter/decrypter according to the algorithm specified by the transmitter, wherein authorization to legally transmit and receive the encrypted digital content legally protected by copyright is received by payment of an appropriate compensation to a content provider.

10. A method for transmitting encrypted digital content that is legally protected by copyright from a transmitter to a receiver, comprising:

connecting over a network to a specific server, the specific server storing identifiers unique to each of several network components to prove the authenticity of the network components and storing information about the authentication procedures that can be used by individual receivers, with the authentication procedures being linked to the unique identifiers, determining whether the identifier unique to a receiver is stored in the specific server, when the unique identifier is stored, verifying that the receiver is a legal system component, and determining the authentication procedure to be used, from the specific server, based on the unique identifier, and when having the determined authentication procedure, verifying the authenticity of the receiver using the determined authentication procedure, and when not having the determined authentication procedure, acquiring the authentication procedure from a source external to the transmitter and then verifying the receiver using the acquired authentication procedure, wherein authorization to legally transmit and receive the encrypted digital content legally protected by copyright is received by payment of an appropriate compensation to a content provider.

11. The transmitting method according to claim 10, further comprising acquiring a key unique to the receiver through the verification process, using the unique key to encrypt a key for decryption of the digital content and use conditions of the digital content, and then transmitting the encrypted decryption key and use conditions to the receiver.

12. The transmitting method according to claim 11, further comprising transmitting information indicating the decryption method for the encrypted digital content to the receiver.

* * * * *